UNITED STATES PATENT OFFICE.

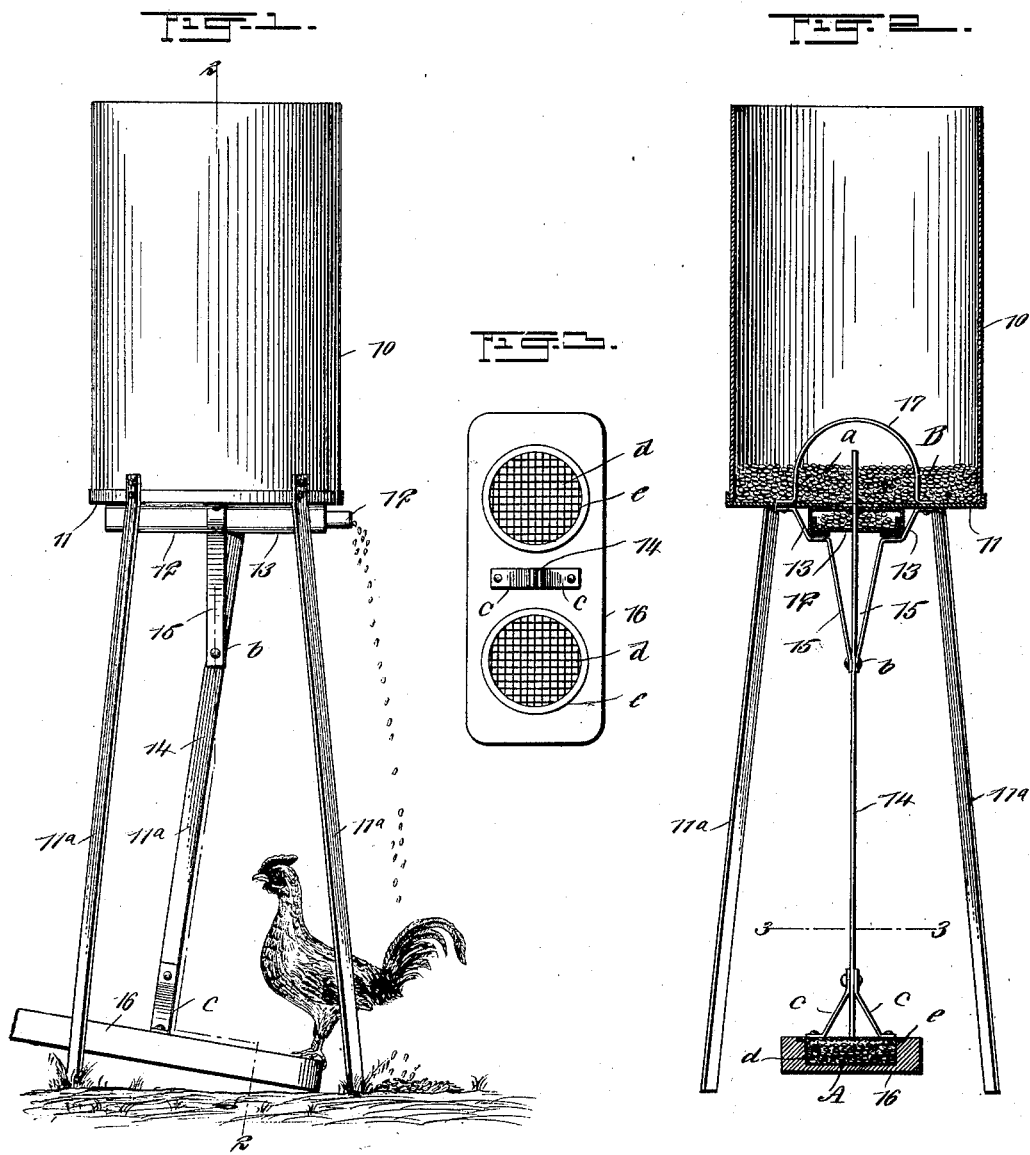

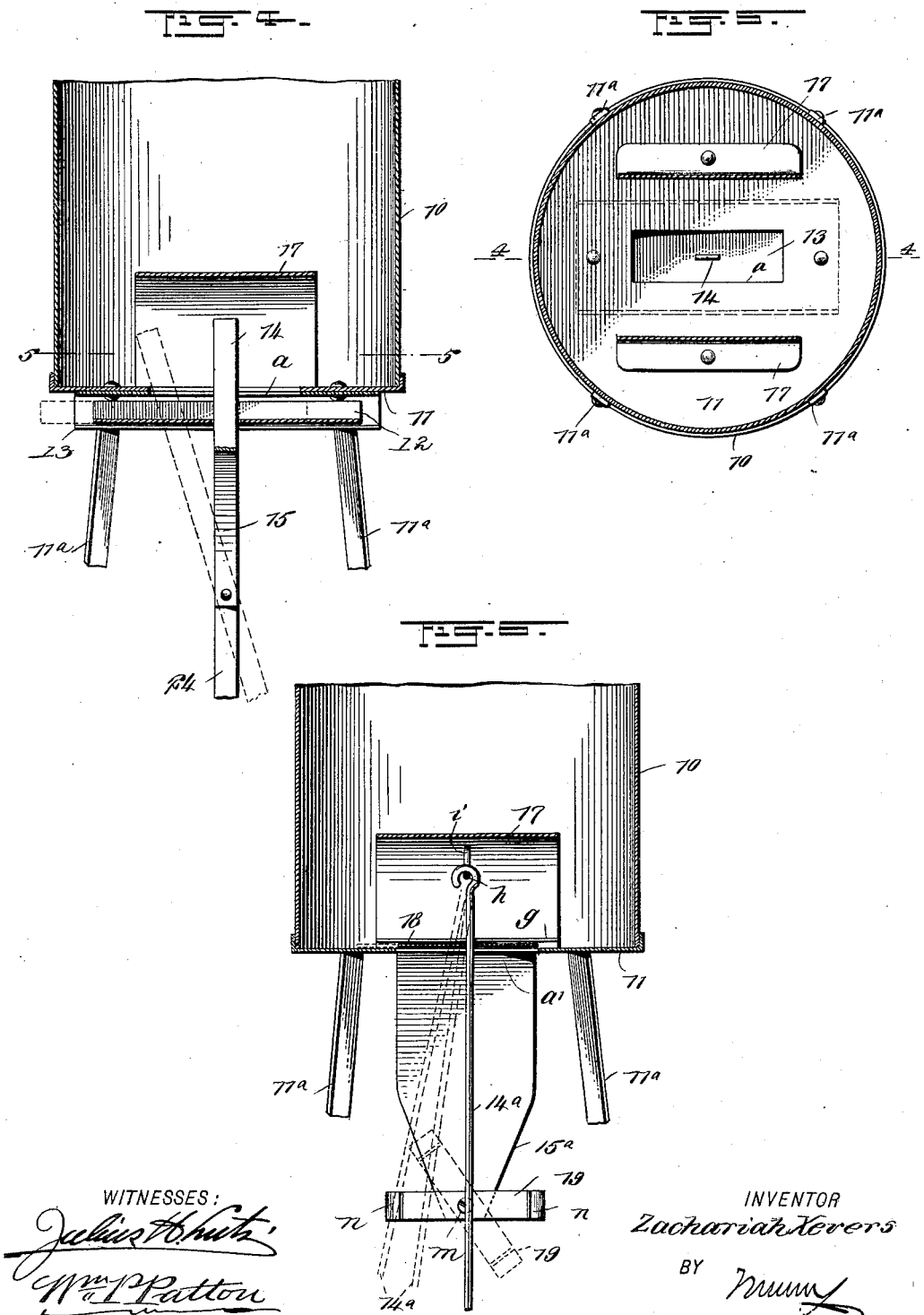

ZACHARIAH XEVERS, OF SANTA CRUZ, CALIFORNIA.

STOCK OR POULTRY FEEDING DEVICE.

SPECIFICATION forming part of Letters Patent No. 701,121, dated May 27, 1902.

Application filed August 22, 1901. Serial No. 72,954. (No model.)

*To all whom it may concern:*

Be it known that I, ZACHARIAH XEVERS, a citizen of the United States, and a resident of Santa Cruz, in the county of Santa Cruz and State of California, have invented a new and Improved Stock and Poultry Feeding Device, of which the following is a full, clear, and exact description.

The object of this invention is to provide a novel simple device that may be actuated by the efforts of domestic animals, such as pigs or poultry of different kinds, to get feed from a bait-box and by such movements of the device effect a graduated discharge of grain from an elevated hopper for supplying food to the pigs or fowls in limited quantity and avoid wasting by surplus feeding of the same.

The invention consists in the novel construction and combination of the several parts, as is hereinafter described, and defined in the appended claims.

Reference is to be had to the accompanying drawings, forming a part of this specification, in which similar characters of reference indicate corresponding parts in all the figures.

Figure 1 is a side view of the device in position for service. Fig. 2 is a sectional side view substantially on the line 2 2 in Fig. 1. Fig. 3 is a partly-sectional plan view of details substantially on the line 3 3 in Fig. 2. Fig. 4 is an enlarged vertical sectional view substantially on the line 4 4 in Fig. 5. Fig. 5 is a partly-sectional plan view substantially on the line 5 5 in Fig. 4, and Fig. 6 is a sectional side view showing a slightly-modified construction of the device.

A receptacle or hopper 10 is provided for holding a proper quantity of grain, and this hopper may be formed cylindrical, as shown, of wood or metal, or a pail, barrel, or other receptacle may be utilized, if this is preferred. The bottom wall 11 of the hopper 10 is of plate metal, preferably circular, and is securable upon the hopper side wall by any suitable means. A suitable number of legs 11$^a$ are secured at proper distances apart on the lower portion of the hopper 10 or, if preferred, upon the bottom 11, these legs having such length as adapts them to support the hopper at a proper distance above the ground or a floor whereon they may be stationed. An elongated opening $a$ is formed in the bottom wall 11, crossing the center thereof and extending an equal degree toward opposite points on the side of the hopper, thus locating the slot or opening at the middle of the bottom, as is clearly shown in Fig. 5. A feeding-chute 12 is held to slide directly below the opening $a$ by two guides 13, that depend oppositely from the bottom wall 11. The chute 12 is slotted or perforated at its center for a loose reception of the swing rod or bar 14, which is pivoted at $b$ a suitable distance below the guides 13 upon bracket-arms 15, that depend from the guides or bottom wall 11, as shown in Figs. 1 and 2. The swing-bar 14 extends upward through the opening $a$ in the bottom wall 11 and from the pivot $b$ extends downward to a point near the ground.

Upon the lower end of the swing-bar 14 a bait-box 16 is secured and held at right angles thereto by the braces $c$. The bait-box is preferably in the form shown, consisting of an oblong receptacle having two spaced cups $d$ therein, each covered with a reticulated lid $e$, the meshes of the wire-netting being too small to permit extraction of the grain A, that is placed in the cups, but yet freely expose the same to view, as best shown in Fig. 3.

A hood 17 is placed in the hopper 10 over the opening $a$ in the bottom plate 11 and is held thereon by suitable means, said hood having an arched form, as represented in Fig. 4. In the hopper 10 a sufficient quantity of grain B is placed, that may be discharged in graduated amount for feeding poultry, as follows: Assuming that a flock of fowls surround the bait-box 16, being called by the male bird of the flock, as the grain in sight is protected by the screen-covers or lids $e$ the fowls, and particularly the rooster, will peck at the covered grain, and the male bird may hop upon the bait-box to scratch over the grain. It will be seen that the natural efforts of the fowls to get at the food held in the bait-box 16 will impart a swinging movement thereto. The pendulum motion given to the bar 14 by the efforts of the fowls, as explained, will slide the chute 12 endwise in each direction of rocking movement given to the bar. The grain placed in the hopper 10 is kept from direct pressure over the opening $a$ in the hopper-bottom by the hood 17 and feeds thereto at each open side of the hood and thence down through said opening into the chute 12. As the vibration of the swing-bar 14 causes the edges of the bar to impinge alternately upon the end walls of the opening a, this will agitate the chute, so as to cause a discharge of grain from either end. In falling the discharged grain will be scattered on the ground to be picked up by the fowls, and obviously if they want more food the operation will be repeated.

In Fig. 6 is shown a modified construction of the apparatus. In this form of the feeding device the hopper 10 may be the same as already described and have like supporting-legs 11ª as well as a similar hood 17. The chute 12, however, is supplanted by a flat gate 18, that is held to slide upon the bottom wall 11 by guides g, that are secured on the bottom at each side of the opening a' therein, the gate having about the same length as said opening, and therefore it will permit the feed to fall through the opening at either end if the gate 18 is moved endwise in either direction. A swing-bar 14ª, which in this construction is shown in rod form, has a hook h formed on its upper end, and said hook engages an eye i, depending from the hood 17. The swing-bar passes through a central perforation in the gate 18. A single bracket-arm 15ª is provided in this construction and depends from the bottom 11 at one side of the opening a'. The rod or swing-bar 14ª is afforded a suitable length and at the lower end carries a bait-box similar to the bait-box 16. Upon the lower end of the bracket-arm 15ª a check-bar 19 is held by a bolt m, adapted to permit a rocking adjustment of the check-bar and effect its clamped retention at any desired point of rocking adjustment. On each end of the check-bar 19 a lateral projection n is formed, these projections being in the path of the rod or bar 14ª when it swings. If the check-bar is adjusted, as shown by full lines in Fig. 6, or in a plane at right angles with the body of the pendent bar 19, it will be seen that the swing of said bar will uncover the opening a' alternately at each end of the same by a sliding movement of the gate 18, whereby a maximum feed of grain is discharged down through the openings at the ends of the gate, such grain obviously falling upon the ground for feeding fowls or small animals, such as pigs. If it is desired to restrict the feed of grain from the opening a', the check-bar 19 is moved on its pivot-bolt m, so as to incline it from a horizontal plane, as indicated in Fig. 6 by dotted lines, and it is evident that by such an adjustment the vibration of the rod or bar 14ª will be controlled, as the bar will be checked in its swinging motion by impinging upon the projections n of the check-bar. At any time it is desired to prevent a swinging movement of the rod or bar 14ª this may be readily effected if the check-bar 19 is rocked into a nearly-vertical position, so that the projections n both have contact with the bar 14ª, which will hold the bar upright and prevent swinging movement until the check-bar 19 is so adjusted as to remove the projections n more or less from the swing-bar.

As before indicated, the hopper-body 10 may be a box or a barrel, having an open top and an aperture cut in the bottom whereon the bottom plate 11 should be secured, and the hopper-body may be secured upon a wall, post, or other stable support, thereby dispensing with a specially-made hopper and saving freight as well as cost of the hopper to a purchaser of the improvement.

It obviously is apparent that many minor changes in the construction and the arrangement of the several parts might be made and substituted for those shown and described without in the least departing from the nature or spirit of the invention.

Having thus described my invention, I claim as new and desire to secure by Letters Patent—

1. The combination of a hopper with a bottom piece having a feed-opening, and attachable on the lower end of a hopper, of a feeding device for discharge of feed from the hopper and slidable at the opening, a swinging bar controlling the feeding device, and means to secure and protect bait at the lower end of the swinging bar for movement by a fowl or animal.

2. The combination with a supported hopper having a feed-opening in the bottom, of a swinging bar, a chute or gate slidable at the opening and controlled by the swinging bar, and means to secure and protect bait at the lower end of said bar for movement by a fowl or animal.

3. The combination with a supported hopper having a feed-opening in the bottom wall, of a rockable bar, a gate or chute in the hopper adapted for longitudinal movement by the movement of the bar, a hood in the hopper over the feed-opening, and a device for holding and protecting bait at the lower end of the bar adapted for movement by a fowl or animal.

4. The combination with a supported hopper having a feed-opening in the bottom wall, of a rockable bar extending up through the feed-opening, a gate or chute in the hopper and through which the bar passes, a bait-box on the lower portion of the bar, and a cup on the bait-box protected by and projecting laterally therefrom, a perforated lid, the bait inducing a fowl or animal to move the bar and discharge feed.

5. The combination with a supported hopper having a feed-opening in the bottom wall, an arched hood over said opening, and a swing rod or bar hung from the hood, of a gate or chute held to slide near the feed-opening and through which the bar passes, and a bait-box projecting laterally from the swing-bar and having a cup protected by a perforated lid, for movement by a fowl or animal.

6. The combination with a hopper, legs on said hopper, guides on the bottom of the hopper at each side of a feed-opening therein, and a gate or chute held to slide between the guides at the feed-opening, of an upright rod or bar adapted to swing in the feed-opening, a device adapted to control the swinging movement of the rod or bar, and means for attaching and protecting a bait on the lower part of the rod or bar for movement by a fowl or animal that endeavors to get the bait.

7. The combination with a hopper, legs on the hopper, guides on the bottom of the hopper at each side of a feed-opening therein, and a hood over said feed-opening, of a gate or chute held to slide at the feed-opening by a loose engagement with the guides, a rod or bar pendent through the feed-opening and also through a perforation in the chute or gate, and having a loose engagement with the hood, a bracket-supported check-bar hung from the hopper and adapted to control the swinging movement of the pendent rod or bar, and a bait-holding device projecting laterally from the lower portion of the rod or bar, adapted to be moved with said bar by efforts of a fowl or animal to get the bait.

8. In a poultry-feeder, the combination with a suitable container, of a reciprocatory valve-slide confined on the bottom of said container, and arranged to traverse a discharge-opening therein, a vertical swinging bar mounted to turn on a horizontal axis and operatively connected with said valve to actuate the latter, and means carried by said bar to serve as a support for a fowl and adapted to receive a bait, whereby the weight of a fowl perched on the bar is adapted to impart movement thereto and to the valve-slide.

In testimony whereof I have signed my name to this specification in the presence of two subscribing witnesses.

ZACHARIAH XEVERS.

Witnesses:
PIUS WETZEL,
C. P. CLARK.